United States Patent [19]

Backs

[11] Patent Number: 5,782,538
[45] Date of Patent: Jul. 21, 1998

[54] SWING AWAY DUMP BLOCKS FOR END DUMP TRAILERS

[75] Inventor: Jason R. Backs, 15811 Oak Mountain Dr., Houston, Tex. 77095

[73] Assignee: Jason R. Backs

[21] Appl. No.: 762,095

[22] Filed: Dec. 9, 1996

[51] Int. Cl.[6] ........................................... B60P 1/16
[52] U.S. Cl. ................................. 298/17.5; 298/22 AE
[58] Field of Search .......................... 298/17 R, 17.5, 298/22 AE, 17 B

[56] References Cited

U.S. PATENT DOCUMENTS

| | | | |
|---|---|---|---|
| 2,997,342 | 8/1961 | Talbert | 298/17.5 |
| 3,083,059 | 3/1963 | Biszantz | 298/17.5 |
| 3,630,571 | 12/1971 | Saldana | 298/22 A |
| 3,640,578 | 2/1972 | Finney | 298/22 AE |
| 4,084,851 | 4/1978 | Duncan, Sr. | 298/22 A |
| 4,375,903 | 3/1983 | Lovell | 298/17.5 |
| 4,883,321 | 11/1989 | Voigt | 298/22 A |
| 4,948,155 | 8/1990 | Smith et al. | 298/22 AE |
| 5,184,872 | 2/1993 | Larochelle et al. | 298/22 A |

FOREIGN PATENT DOCUMENTS 1586936  8/1990  U.S.S.R. .

Primary Examiner—Karen M. Young
Assistant Examiner—Gregory A. Morse
Attorney, Agent, or Firm—Howard L. Rose

[57] ABSTRACT

A frameless end dump trailer has one or more rotating structures placed in its subframe and suspension area in order to permit the use of a single point suspension in a tandem axle configuration in an unrestricted rotation mode with the option to engage the rotating structure to severely limit the rotation of the single point suspension.

6 Claims, 3 Drawing Sheets

SWING AWAY DUMP BLOCKS FOR END DUMP TRAILERS

The present invention relates to multiple axle frameless end dump trailers and more particularly to such a trailer having a single point suspension.

BACKGROUND OF THE INVENTION

There are three basic types of end dump trailers; frameless, full frame, and quarter frame. On a standard frameless dump trailer, the suspension and wheels are rigidly connected to the body so that when it dumps only the rearmost wheels stay on the ground and the trailer body rotates about the point where the tires contact the ground. A rigid structure (dump block) engages the rear axle at the spring end cap early in the dump cycle (approximately 10-15 degrees into the cycle) and then transfers the point of rotation from the trunnion tube to the rear axle and tire. As a result, the rear end of the trailer significantly drops down during dumping.

On a full frame dump trailer, there is a long frame that spans the entire length of the trailer from the coupler plate in front to the hinge where the trailer body is connected to the frame. This frame remains horizontal and connected to the truck during dumping while a hydraulic cylinder lifts the front of the trailer body. As a result, all of the tires remain in contact with the ground throughout the entire dump cycle and the rear end of the trailer does not drop down significantly relative to a frameless trailer. On a quarter frame dump trailer, there is a partial frame that extends from the rear hinge (where the trailer body is connected to the frame) to slightly forward of the front axle of the trailer. A mechanical linkage is utilized to hold down the front end of this frame which would otherwise rise upward due to instability caused by the weight of the trailer body and payload acting eccentrically to the supports for the frame. As a result, a quarter frame trailer is able to dump similarly to a full frame trailer where all wheels maintain contact with the ground and the rear end does not drop down.

In some applications, the quarter frame trailer has certain advantages over full frame or standard frameless trailers. When compared to a full frame trailer with an equal length hydraulic cylinder, a quarter frame trailer provides a higher dumping angle and a fairly significant weight advantage, thereby allowing it to carry a greater payload and remain in compliance with highway load limits. When compared to a standard frameless trailer, a quarter frame trailer provides equal or better stability while dumping and the rear end of the trailer does not drop down during the dumping process, but accomplishes this at a significant weight penalty. Because of these advantages and the fact that many customers have applications which necessitate a floor sheet dumping height which is nearly that of a frame type or quarter frame trailer, it is extremely desirable to provide a frameless trailer which can provide the stability gained by all of the tires remaining on the ground and having an option to revert to the standard configuration frameless end dump where the front axle lifts off of the ground.

STATEMENT REGARDING FEDERALLY SPONSORED RESEARCH OR DEVELOPMENT

Not applicable

OBJECTS OF THE PRESENT INVENTION

It is an object of the present invention to provide a frameless end dump trailer that permits all of the tires to remain on the ground in one dumping mode while in the secondary dumping mode forcing the front axle to lift off of the ground while the trailer rotates about the rearmost axle and tire to retain the necessary floor sheet height through the entire dump cycle.

It is another object of the present invention to restrict the rotation of a single point suspension by rotating a solid structure into place to engage the suspension and the trailer undercarriage.

It is another object of the present invention to provide a system to engage the swinging solid structure automatically as the trailer begins the dump cycle through the use of one or more pneumatic or hydraulic cylinders and one or more valves.

BRIEF SUMMARY OF THE PRESENT INVENTION

The frameless end dump trailer of the present invention consists of: a trailer body; a hydraulic cylinder for raising the trailer body; a draft arm assembly connected between the approximate center of the trailer body and the lower end of the hydraulic cylinder (to stabilize the trailer body during dumping); a subframe to which the trailer body is solidly connected and to which the suspension, axles and wheels are mounted; and a hinged structure which is mounted such that it can engage the rear axle and the trailer undercarriage or rotate to a position in which the structure is completely disengaged.

The underlying problem is solved by the use of a rotatable structure to allow the single point suspension to rotate freely throughout the entire dump cycle (approximately 48 degrees) while also providing a solid structure that when rotated into place will severely limit the rotation of the single point suspension to cause the trailer to rotate about the rear axle for the majority of the dump cycle and thereby provide a higher floor sheet level. Other manufacturers have addressed this dual dumping scenario with telescoping structures which effectively restrict the rotation of the single point suspension, but lack the ability to offer unrestricted rotation throughout the entire dump cycle of the single point suspension in the alternate mode.

The above and other features, objects and advantages of the present invention, together with the best means contemplated by the inventor thereof for carrying out the invention will become more apparent from reading the following description of a preferred embodiment and perusing the associated drawings in which:

DETAILED DESCRIPTION OF THE PRESENT INVENTION

Figure 1:
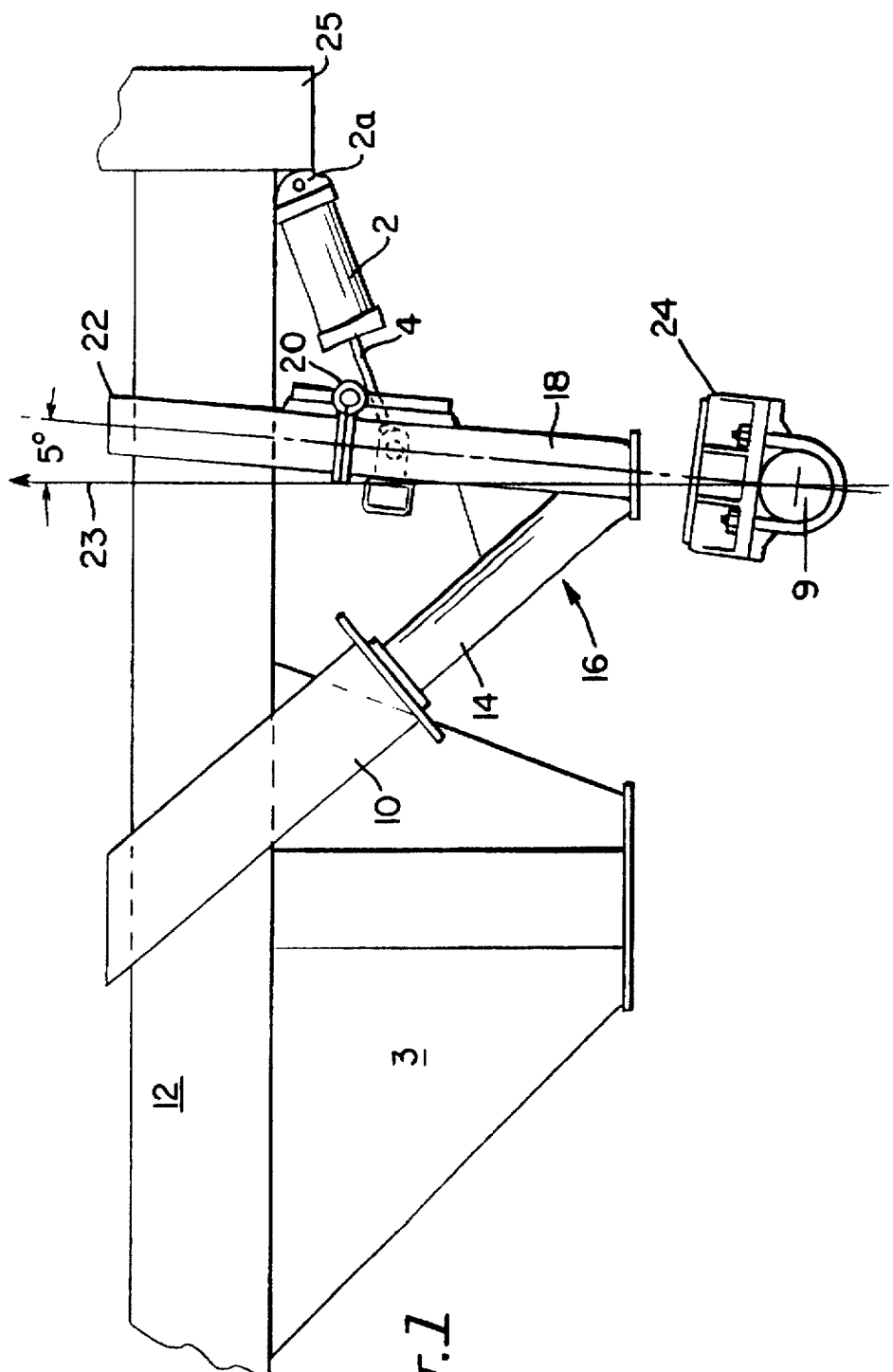
FIG. 1 is a side view in elevation of the frameless end dump trailer of the present invention in the level position.
Figure 2:
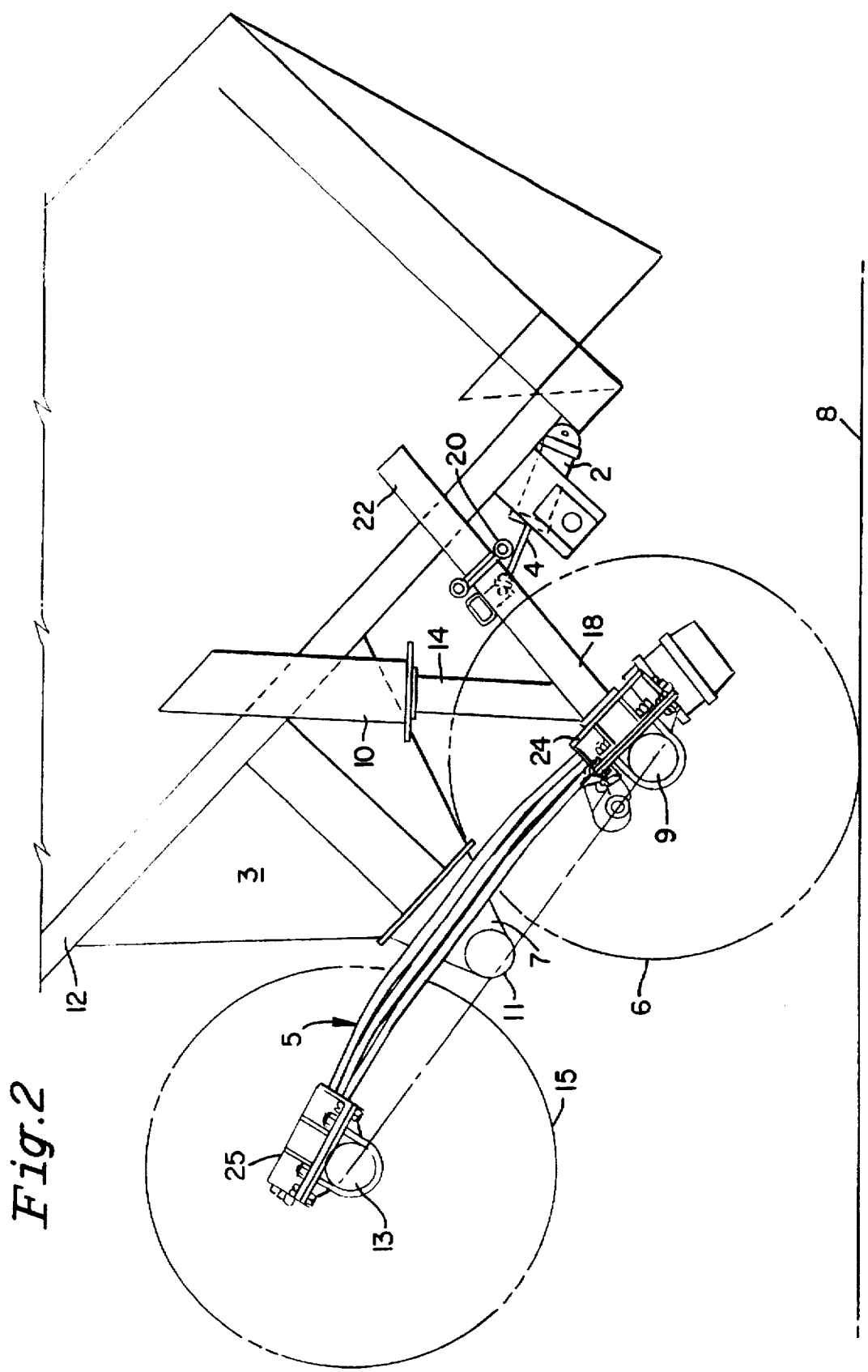
FIG. 2 is a side view of the rotating structure of the frameless end dump trailer of the present invention in the restricted dump position.

Referring now specifically to FIG. 1 of the accompanying drawings a main body 12 of a trailer has a Bogie Pod 3 extending downward under the body. As seen in FIG. 2, a pedestal 7 is secured to the bottom of the Bogie Pod and supports a trunnion 11 that extends under springs 5 of a single point suspension system. The springs 5 support spring end caps 24 and 25 at their opposite ends, one cap 24 disposed closest to the rear of the tractor. The caps 24 and 25 support axles 9 and 13, respectively of two sets of wheels 6 and 15; the wheels being shown with tires.

Returning to FIG. 1, a stop block 10 extends down from trailer body 12 at approximately a 50 degree angle and in the non-dump position contacts a leg 14 of a V-shaped dump block 16. A second leg 18 of the dump block 16 is hinged at 20 to the lower end of a strut 22 also extending down from the trailer body. The leg 18 of the dump block is, in the restricted position, disposed immediately above the rear spring end cap 24. ((The element 10 is also commonly referred to as dump block but a different name (one that is also used in the trade) has been assigned to it to avoid confusion). An air cylinder 2 is pivoted at 2a under the trailer body 12 immediately adjacent the rear of the body and has a shaft 4 connected to the leg 18 of the dump block 16. The angle of contact between the dump block 16 and the spring end cap 24 is such as to provide an overcenter orientation between these elements. More specifically an angle of about 5 degrees is established between the centerline of the elements 18 and 22 on the one hand and the line 23 representing the force developed by the spring end cap 24 when in contact with member 18. Thus the force pushes forward, once in contact with cap 24, providing an overcenter effect that locks the members in place.

Referring now specifically to FIG. 2 of the drawings, the trailer is illustrated in a dump position with a forward set of wheels 15 raised off the ground and rearmost rear wheels 6 on the ground.

As the body is raised the leg 18 of dump block 16 descends and contacts end cap 24 as the body rotates about axle 9 of wheel 6. It is noted that the rear of the trailer retains its height above the ground and the dump block 18 assumes an overcenter position relative to the axle 9, about 5 degrees.

Figure 3:
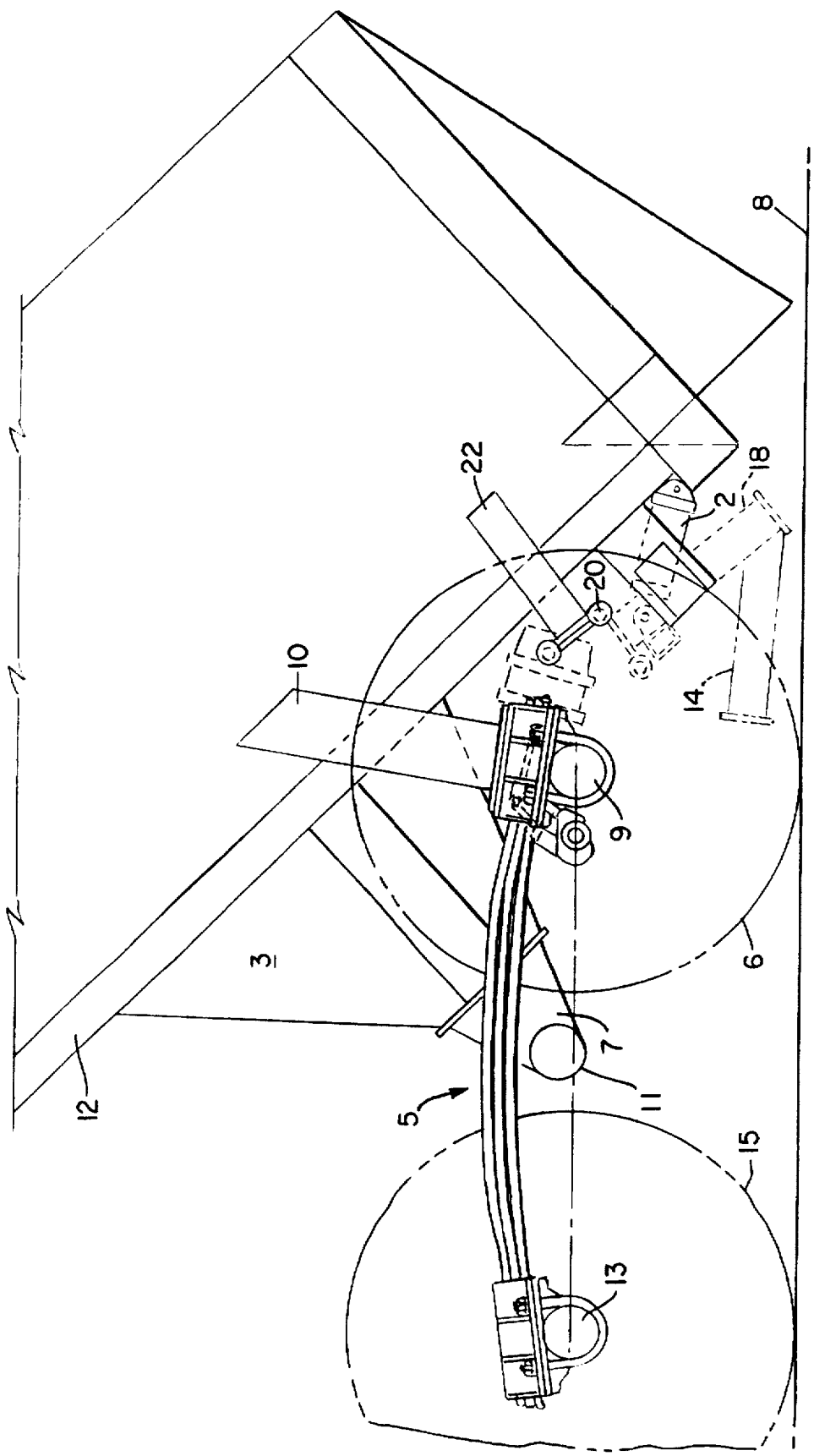
FIG. 3 is a side view of the rotating structure of the frameless end dump trailer of the present invention in the unrestricted dump position.

Referring now to FIG. 3 of the drawings the trailer is illustrated with the body at a higher angle relative to the ground and with all wheels on the ground 8. The rear end of the trailer is also closer to the ground than the trailer body as illustrated in FIG. 2.

To accomplish the change, the air cylinder 2 is activated to rotate the dump block 16 out of the path of member 10 so that the member 10 can descend into contact with spring end cap 24. Thus no upward force is exerted on the springs 5 and the wheels 6 and 15 maintain contact with the ground.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A trailer body having a front end and a rear dump end, a spring suspension having spring end caps a Bogie Pod located generally adjacent the dump end of the trailer and having means for engaging the spring suspension of the trailer to provide a single point suspension a dump block secured to said trailer body and rotatable between first and second positions, and a stop block secured to said trailer body, said dump block in said first position being engagable by one of said spring end caps, said stop block being engagable by said one spring end cap when said dump block is in said second position.

2. A trailer body according to claim 1 further comprising two sets of rear wheels having axles, said spring suspension including springs extending between said spring end caps with each supporting a different axle of said wheels.

3. A trailer body according to claim 2 wherein said means for engaging engages said spring under said springs between said spring end caps.

4. A trailer body according to claim 1 wherein said dump block comprises a V-shaped member having one leg pivotally secured to said tractor body and disposed above the rearmost spring end cap, and the other leg of the V-shaped member engaging said stop block.

5. A trailer body according to claim 4 wherein the dump block rotates eccentrically relative to the line of force from the rear set of wheels to provide an over center positive engagement between the trailer body and the axle of the rear set of rear wheels.

6. A dump trailer body convertible between two types of operations comprising a trailer body pivoted at its back end for dumping, a pair of rear wheels on each side of said body having a front rear wheel and a rear rear wheel, and means for converting a dumping function from one in which both pair of rear wheels remain in engagement with the ground during dumping and one in which only the rear most wheels remain in contact with the ground during a dumping operation, said means including, a pair of spring end caps, a different end cap supporting an axle for each of said pair of rear wheels, springs extending between said spring end caps, a stop block extending downwardly from said trailer body, a Bogie pod secured under said trailer body and supporting a shaft under said spring, a strut extending down from said trailer body rearwardly of said stop block, a dump block secured under said trailer body and rotatable between said first and a second position, said dump block in a first position extending between a first spring end cap supporting the axle for the back rear wheels, said stop block and said strut, said first spring end cap being contacted by said stop block when said dump block is in said second position, said shaft of said Bogie pod contacting the underside of said spring to raise the front wheel of said rear wheels.

* * * * *